(12) United States Patent
Eriksson et al.

(10) Patent No.: US 9,667,464 B2
(45) Date of Patent: May 30, 2017

(54) SINGLE ENDED LINE TEST METHODS FOR TIME DUPLEX DIVISION DEVICES

(75) Inventors: Per-Erik Eriksson, Stockholm (SE); Miguel Berg, Upplands Väsby (SE); Daniel Cederholm, Sollentuna (SE); Klas Ericson, Göteborg (SE); Chenguang Lu, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 112 days.

(21) Appl. No.: 14/355,517

(22) PCT Filed: Feb. 14, 2012

(86) PCT No.: PCT/EP2012/052527
§ 371 (c)(1),
(2), (4) Date: Apr. 30, 2014

(87) PCT Pub. No.: WO2013/064272
PCT Pub. Date: May 10, 2013

(65) Prior Publication Data
US 2014/0307763 A1  Oct. 16, 2014

Related U.S. Application Data

(60) Provisional application No. 61/554,650, filed on Nov. 2, 2011.

(51) Int. Cl.
*H04L 27/26* (2006.01)
*H04B 3/46* (2015.01)
*H04M 3/30* (2006.01)
*H04L 5/14* (2006.01)
*H04L 12/26* (2006.01)

(52) U.S. Cl.
CPC ......... *H04L 27/2634* (2013.01); *H04B 3/46* (2013.01); *H04L 5/14* (2013.01); *H04L 27/263* (2013.01); *H04L 43/50* (2013.01); *H04M 3/306* (2013.01)

(58) Field of Classification Search
CPC ......... H04B 3/46; H04L 27/2634; H04L 5/14; H04L 27/263; H04M 3/306; H04M 3/304
See application file for complete search history.

(56) References Cited

U.S. PATENT DOCUMENTS

2009/0323902 A1  12/2009  Dinesh et al.

FOREIGN PATENT DOCUMENTS

WO   WO 2006/081484    8/2006
WO   WO 2010/064977    6/2010

OTHER PUBLICATIONS

International Search Report for International Application No. PCT/EP2012/052527, Jul. 6, 2012.
PCT Written Opinion of the International Searching Authority for International Application No. PCT/EP2012/052527, Jul. 6, 2012.

*Primary Examiner* — Derrick Ferris
*Assistant Examiner* — Kevin Lee
(74) *Attorney, Agent, or Firm* — Baker Botts, LLP (57) ABSTRACT

The present disclosure relates to a Time Duplex Division (TDD) modem and a method in such a modem for making Single Ended Line Test (SELT) measurements. The device comprises a transmitter and a receiver and it has a normal mode of TDD communication. In these devices, Time Domain Reflectometry (TDR) is used as line measurement. It has a number of drawbacks, and for overcoming said drawbacks, Frequency Domain Reflectometry (FDR) measurement techniques adapted for TDD devices are suggested.

21 Claims, 8 Drawing Sheets

SINGLE ENDED LINE TEST METHODS FOR TIME DUPLEX DIVISION DEVICES

PRIORITY

This nonprovisional application is a U.S. National Stage Filing under 35 U.S.C. §371 of International Patent Application Serial No. PCT/EP2012/052527, filed Feb. 14, 2012 and entitled "Single Ended Line Test Methods for Time Duplex Division Devices," which claims the benefit of U.S. Provisional Application No. 61/554,650, filed Nov. 2, 2011 and entitled "Single Ended Line Test Methods for Time Duplex Division Devices."

TECHNICAL FIELD

The present disclosure relates to a Time Duplex Division (TDD) modem and a method in such a modem for making Single Ended Line Test (SELT) measurements.

BACKGROUND

For communication systems, Time Division Duplexing (TDD) is a mode of communication operation where transmission and reception are separated in time. This separation typically means that certain parts of the modems can be simplified compared with Frequency Division Duplexing (FDD) systems, which transmit and receive simultaneously but at different frequencies. Such simplification is desired since it saves both costs and valuable circuit board space. In the analog front end, TDD systems can omit the costly hybrid, which separates the transmitted and received signals in FDD systems like VDSL2, see reference [1].

In the digital domain, OFDM-based TDD systems do not need separate FFT/IFFT blocks for reception and transmission but can reuse the same block since there is a simple relation between the Fast Fourier Transform (FFT) and the Inverse Fast Fourier Transform (IFFT).

Single-Ended Line Test (SELT) typically comprises measurement of echo (input reflection) and Quiet Line Noise (QLN).

The only SELT method that is compatible with the TDD feature of transmission and reception in separate timeslots is Time Domain Reflectometry (TDR). TDR systems typically transmit a short high-energy pulse since the pulse length determines the resolution and the pulse energy determines the reach.

A pulse is transmitted to the line (with receiver turned off) and a switch from transmission to reception is made shortly after the transmission of the TDR pulse. Many commercial TDR measurement instruments are also designed in this way.

Figure 2:
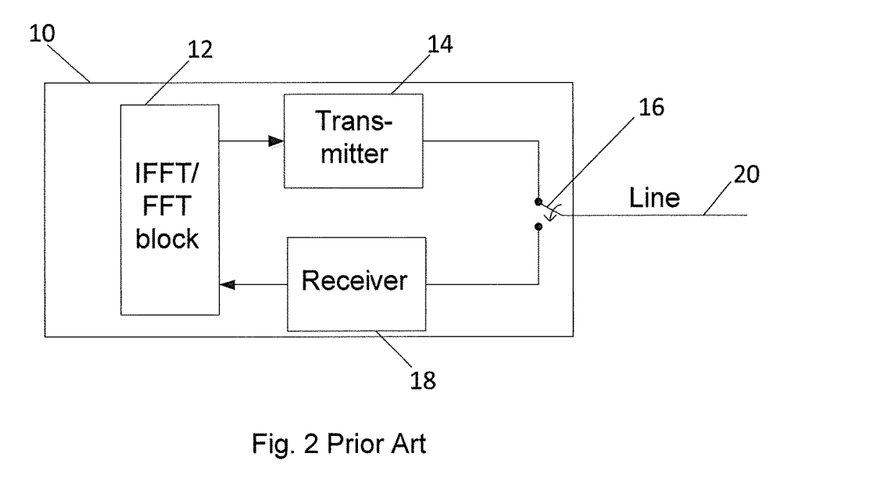
FIG. 2 is a block diagram of a schematic TDD device according to prior art.

FIG. 2 illustrates a known TDD device 10 operating according to the TDD principle applied to an Orthogonal Frequency Division Multiplexing (OFDM) based system. The device 10 comprises a transmitter 14 and a receiver 18. The transmitter 14 and the receiver 18 operate alternately as a switch 16 alters the connection to the transmission line 20. There is one common IFFT/FFT block 12 either operating in the IFFT mode during transmission or in FFT mode during reception. The IFFT/FTT covers the whole bandwidth for downstream and upstream transmission.

One problem when implementing TDR in a communication modem is the transmission of the narrow high-energy pulse which put high demands on the analog front end, especially the transmit amplifier.

Another problem is that it will have a dead zone where no echoes will be visible. This dead zone is determined by the length of the pulse and the time needed to switch from transmission to reception. Further, the switching time for a communication modem may be much longer than for a tailored TDR measurement instrument since the modem is typically designed based on the requirements for communication operation.

SUMMARY

One object of the following disclosure is to provide measurement techniques and Time Division Duplexing TDD devices, such as modems or transceivers, which overcome the above described problems that may limit the accuracy and/or reach of the measurement.

According to one aspect, the object is achieved by embodiments of a method in a TDD modem for making line measurements. The device has a transmitter and a receiver, which are connectable to a transmission line. The device has a normal mode of TDD communication. The line measurement method comprises to make a Frequency Domain Reflectometry FDR Single Ended Line Test SELT measurement by sending a test signal to the line, during which FDR measurement the transmitter and receiver operate simultaneously.

According to another aspect, the object is achieved by embodiments of a TDD modem for making line measurements. The device comprises a transmitter and a receiver, and has a normal mode of TDD communication. The device further comprises means for performing Frequency Domain Reflectometry FDR Single Ended Line Test SELT measurement. The line measurement method comprises to make a Frequency Domain Reflectometry FDR Single Ended Line Test SELT measurement by sending a test signal to the line to which the transmitter and receiver operate simultaneously during the measurement.

Further aspects and alternative embodiments are presented in the following detailed description.

One advantage is that the suggested embodiments provide improved ways of SELT measuring, e.g. accuracy, which are adapted to TDD modem so that it is able to perform Frequency Domain Reflectometry measurements, contrary to its normal mode of operation but using substantially the same hardware.

BRIEF DESCRIPTION OF THE DRAWINGS

The foregoing, and other objects, features and advantages of the present invention will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

Figure 1:
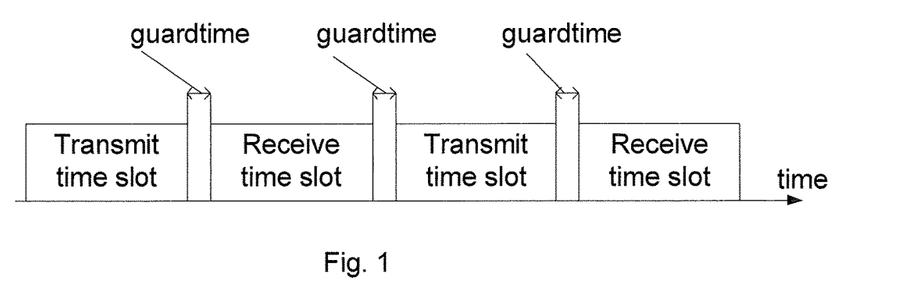
FIG. 1 is a diagram illustrating the transmission principle in a TDD system.

FIG. 1 is a diagram illustrating the transmission principle in a TDD system. A TDD system operates according to normal mode of TDD communication in alternating transmit and receive time slots. The figure shows the guard intervals between transmit and receive time slots.

FIG. 2 is a block diagram of a schematic TDD device according to prior art. In the illustrated example, the TDD principle is applied to an Orthogonal Frequency Division Multiplexing (OFDM) based system. The TDD device 10 is connected to a line 20, and the device 10 comprises a common IFFT/FFT block 12 which is a processor or processing means transforming amplitude values to symbols and vice versa. The common IFFT/FFT block 12 is operating in the IFFT mode during transmission and in FFT mode during reception. The IFFT/FTT processing covers the whole bandwidth for downstream and upstream transmission. The TDD device 12 comprises a transmitter 14, a receiver 18 and a switch 16. The transmitter 14 and the receiver 18 operate alternately in accordance with the TDD feature of transmission and reception in separate timeslots, as illustrated in FIG. 1. The switch 16 alternating connects the receiver and the transmitter to the transmission line 20, also denoted as the loop.

The only SELT method that is compatible with the TDD feature of transmission and reception in separate timeslots is Time Domain Reflectometry (TDR). TDR systems typically transmit a short high-energy pulse since the pulse length determines the resolution and the pulse energy determines the reach.

A pulse is transmitted to the line with receiver turned off and a switch from transmission to reception is made shortly after the transmission of the TDR pulse. Many commercial TDR measurement instruments are also designed in this way.

Figure 3:
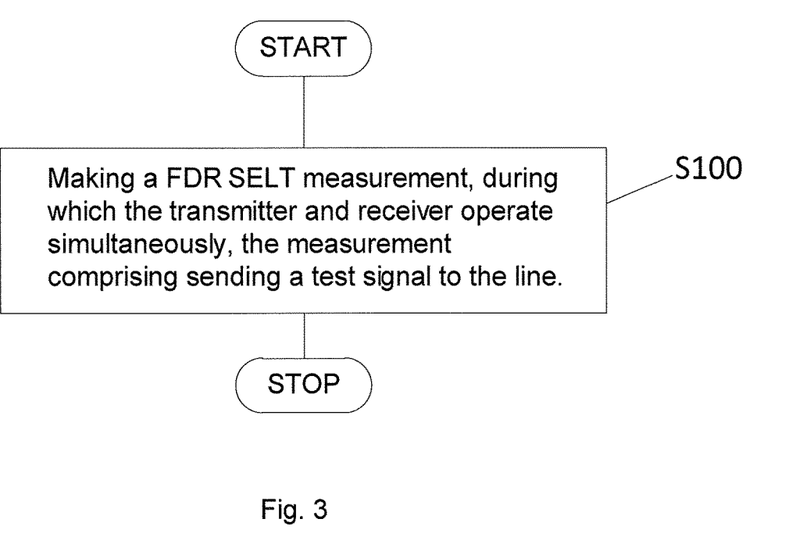
FIG. 3 is a flowchart illustrating one aspect of making line measurement adapted for a TDD modem.

FIG. 3 is a flowchart illustrating one aspect of making line measurement adapted for a TDD modem, comprising a transmitter and receiver, which is connected or connectable to a transmission line. Said aspect provide methods for making a FDR SELT line measurement in a TDD modem by sending a test signal to the line, during which the transmitter and receiver operate simultaneously. Thus, the methods comprise the step S100:

Making a FDR SELT measurement, during which the transmitter and receiver operate simultaneously, the measurement comprising sending a test signal to the line.

Figure 4:
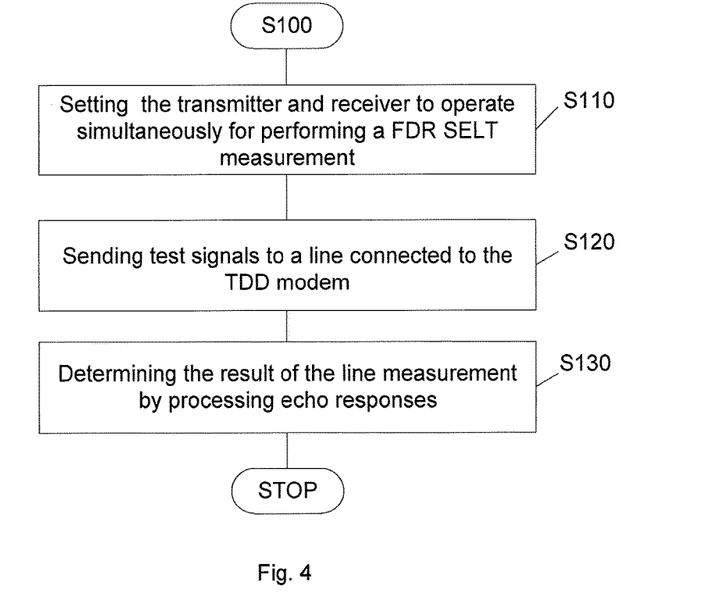
FIG. 4 is a more detailed flowchart showing embodiments of making line FDR SELT measurements by means of a TDD device.

FIG. 4 is a more detailed flowchart showing embodiments of making line FDR SELT measurements by means of a TDD device.

The methods in a TDD modem for making line measurements comprise S110:

Setting the transmitter and receiver to operate simultaneously for/when performing a FDR SELT measurement, said making the measurement comprising:

S120:—Sending test signals to a line connected to the TDD modem, and receiving echo responses from the line, wherein the test signals comprises discrete tones which number and characteristic features (per data symbol) are adapted to the receiver performance and the resources of the processing means;

S130:—Determining the result of the line measurement by processing of said received echo responses.

Figure 5:
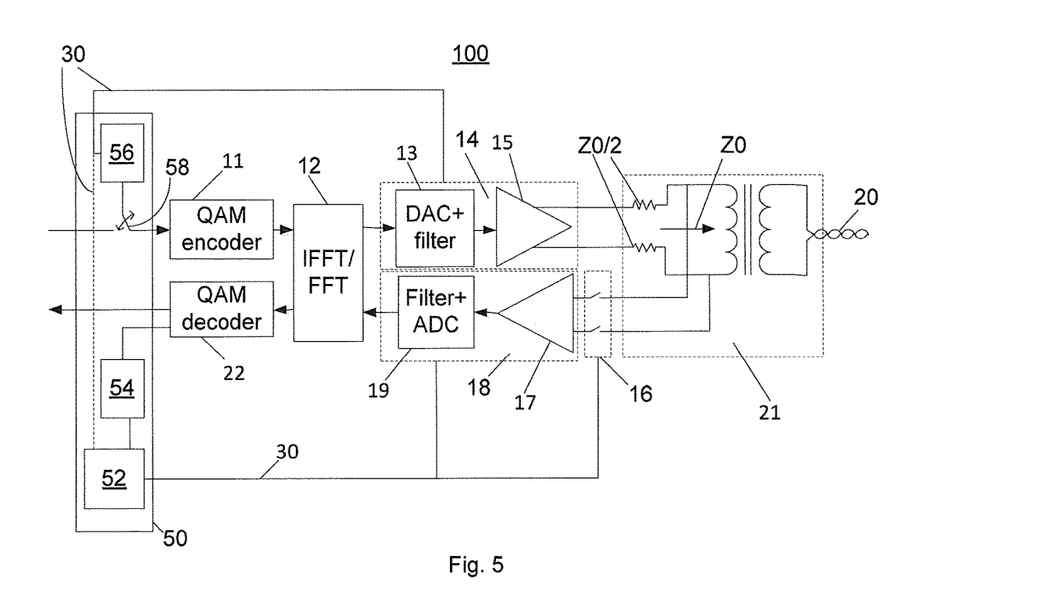
FIG. 5 is a block diagram illustrating an embodiment of a TDD device adapted for FDR measurement, and thus for implementing the above described methods.

FIG. 5 is a block diagram illustrating an embodiment of a TDD device adapted for FDR measurement, and thus for implementing the above described methods, in an OFDM based system. The TDD device 100 may be a, e.g. a TDD modem or a TDD transceiver. The device comprises a Quadrature Amplitude Modulating, QAM, encoder 11 connected to an IFFT/FFT block 12, which is connected to a transmitter block 14. In this illustrated example, the IFFT/FFT block 12 is common and shared by the transmitter side and the receiver side of the TDD device. Said transmitter block 14 comprises transmitter circuitry (not shown), a block 13 with Digital-to-Analog Converter, DAC, circuitry and filters, and an output power amplifier 15. Transmitter circuitry may be a modulator, oscillator circuitry and filters. The transmitter block 14 is connected to the communication line 20 via an impedance block 21. The function of the impedance block 20 is to adjust the out/in impedance Z0 of the TDD device to the impedance of the transmission line 20.

The device also comprises a receiver side having a receiver block 18. A switch 16 is connected between the impedance block 21 and the receiver block 18. During normal mode of TDD communication as illustrated in FIG. 1, i.e. in alternating transmit and receive time slots, the switch 16 is controlled by a control processor (not shown) of the TDD device to open and disconnect the receiver block 18 during transmission time slots, and to close and connect the receiver block to the transmission line 20 during receive time slots.

The receiver block 18 comprises receiver circuitry (not shown), e.g. a demodulator, oscillator circuitry and filters. The block 18 also comprises input stage amplifier block 17, filters and an Analogue-to-Digital converter 19. A received signal is processed by the IFFT/FFT block and decoded by a Quadrature Amplitude Modulation, QAM, decoder 22.

During normal mode of TDD communication, the TDD device may be connected to one or more communication devices of end users. Data traffic comprising a stream of bits from data packets are fed to the QAM encoder 11. Data traffic comprising a stream of bits received over the transmission line 20 is fed from the QAM decoder 22 to the end users.

A basic concept is to perform high quality FDR SELT for a TDD system. This includes enabling simultaneous transmission and reception and how to utilize the dynamic range of the A/D converter in the best way.

A new and improved way of measuring is to adapt a TDD modem in a OFDM based communication system so that it is able to perform a Frequency Domain Reflectometry (FDR) measurement, contrary to its normal mode of operation but using substantially the same hardware.

As this requires simultaneous reception and transmission, it requires changes to the TDD system, which is normally designed to either transmit or receive but not both at the same time. For providing the possibility to perform SELT measurement of the connected transmission line 20, embodiments of the present TDD device is equipped with a SELT measurement block 50. Said block 50 provides embodiments of methods in a TDD modem for making FDR SELT measurements during which the transmitter 14 and receiver 18 operate simultaneously and test signals are sent to the line.

According to the illustrated example in FIG. 5, the SELT measurement block 50 is connectable to the QAM encoder 11 and connected to the QAM decoder 22. Connection to the QAM encoder may be established by means of a switch 58 that are controlled to connect either the measurement block 50 to the encoder 11 during a measurement period or the end users communication devices during normal mode of TDD communication. The SELT measurement block 50 comprises a controller unit 52, which is configured to control the switch 58.

The SELT measurement block 50 may also comprise a test signal generator 56 and a measurement processor 54. The test signal generator 56 is preferably adapted to generate a bitsequence that is transformed to by the encoder 11, processing means 12 and DAC 13 to a SELT sequence of signals which is sent over the line 20 and the resulting echo signals are received by the TDD device. The resulting echo signals of a sent test signal in a measurement are signal processed by the measurement processor 54 and the result may be stored or transferred to external equipment, e.g. a display or screen for displaying the result of the measurement.

The controller unit 52 may control the startup of a SELT FDR measurement, the TDD device during the measurement and the return of TDD device to normal mode of TDD communication. The controller unit 52 is therefore configured to send commands or instructions via control buses 30 to the switches 58, the test signal generator 56 and the measurement processor 54 of the SELT measurement block 50, but also to components or blocks of the TDD device. Thus, the controller unit 52 may therefore be configured to send commands or instructions via control buses 30 to the switches 16, and to the components of the transmitter block 14 and the receiver block 18.

The test signal generator generates a bit sequence of complex numbers that are encoded in the QAM encoder into complex numbers $Z_K$ representing data values in the frequency domain. The IFFT/FFT processor 12 transforms the $Z_K$ values into discrete time domain signals $X_n$. The SELT signal $X_n$ are converted to a SELT continuous time domain test signal X(t).

FDR SELT measurement is achieved by closing the switches 16 to the receiver 18, the reflected signal and part of the transmitted signal will go into the receive amplifier 17 and the AD converter 19.

As illustrated in FIG. 5, even when the output impedance Z0 is perfectly matched to the line impedance, the lack of a hybrid in TDD systems means that the receiver may see about half of the transmitted signal, which will impact the receiver amplifier 17 and/or the A/D converter 19. Possible problems include gain compression and/or clipping, causing the echo signal to become unusable. If proper care is not taken, the receiver could even be damaged by a high-power transmitter. Furthermore, the IFFT/IFFT is only anticipated to work in either mode for a classical TDD system.

The following text describes how to modify a TDD system in order to be able to achieve better measurement accuracy when performing FDR measurements.

Figure 6:
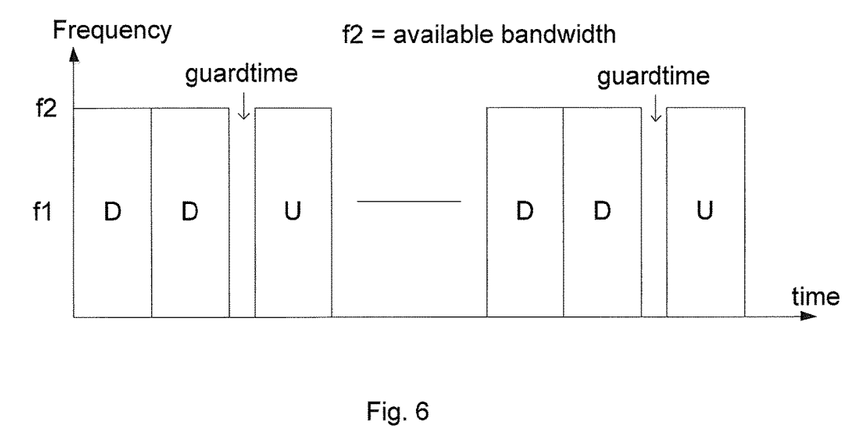
FIG. 6 is a time/frequency diagram illustrating how the same bandwidth is used for downstream D and upstream U transmissions.

FIG. 6 is a time/frequency diagram illustrating how the same bandwidth is used for downstream D and upstream U transmissions but at different time instances. The guard time is the quiet time between that the transceiver transmits data and starts to receive data. The guard time typically consists of the channel delay plus A/D conversion time and FFT or IFFT processing time. The value f2 is the available bandwidth for the Orthogonal Frequency Division Multiplexing OFDM, which is characterized in the use of relatively large number of narrowband subcarriers. By using less bandwidth, i.e. fewer subcarriers in the IFFT/FFT block or resource, resources can be freed such that the IFFT/FFT block or resource can be separated into an IFFT block or resource 12a and an FFT block or resource 12b working simultaneously but at a lower bandwidth, see embodiments described in FIGS. 9 and 10. The IFFT processing for the test signal may be reduced compared to IFFT processing for signals sent during normal communication mode by adapting the test signals to the available resource of the IFFT processing means.

Figure 7:
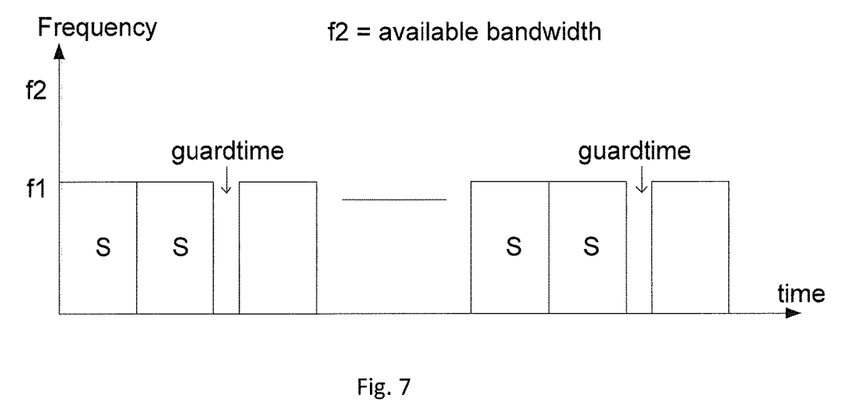
FIG. 7 is a time/frequency diagram corresponding to FIG. 6, but wherein one embodiment for improving FDR SELT measurement is illustrated.

FIG. 7 is a time/frequency diagram corresponding to FIG. 6, but wherein one embodiment for improving FDR SELT measurement is illustrated. In each time slot, at least one SELT test signal is transmitted and the corresponding echo response or responses are received. S is thus involving both the transmitted SELT signal(-s) and their corresponding response(-s). In said embodiment the number of subcarriers is reduced resulting in the bandwidth f1, which is less than the available bandwidth f2. The frequency f1 may be denoted as SELT bandwidth. The bandwidth f1 is less or equal to the available bandwidth f2 due to the split of the IFFT/FFT processor resource. In a common mode the processing resource is split or shared where one share is dedicated or allocated for IFFT processing of the test signal to be transmitted and the other share is dedicated or allocated for FFT processing of the corresponding SELT-echo signal. Thus, the IFFT/FFT processing is performed in a common mode enabling FFT processing and IFFT processing to be processed simultaneously. Said simultaneous processing could be achieved in different ways. The IFFT/FFT processor may comprise two separate hardware blocks, e.g. two separate processors, which could be operated simultaneously in a common mode, wherein the generation and transmission of a test signal is performed within the same time slot as the reception of the SELT-echo corresponding to a sent SELT test signal. Alternatively, the IFFT/FFT processor software is set to operate simultaneously in a common mode, wherein the processing software resource is split or shared, where one share is dedicated or allocated for IFFT processing of the test signal to be transmitted and the other share is dedicated or allocated for FFT processing of the corresponding SELT-echo signal. Simultaneous operation may be implemented as the generation and transmission of a test signal is performed within the same time slot as the reception of the SELT-echo corresponding to a sent SELT test signal.

According to one alternative embodiment of reducing the IFFT processing, said processing is reduced by using a lower highest frequency, e.g. f1 as illustrated in FIG. 7, in the test signal compared to the highest frequency, f2 in FIG. 6, used in a signal sent during normal communication mode. Thus, the generation of test signals in the test signal generator 56 is preferably adapted to the resource of the IFFT/FFT processing means 12.

Figure 8:
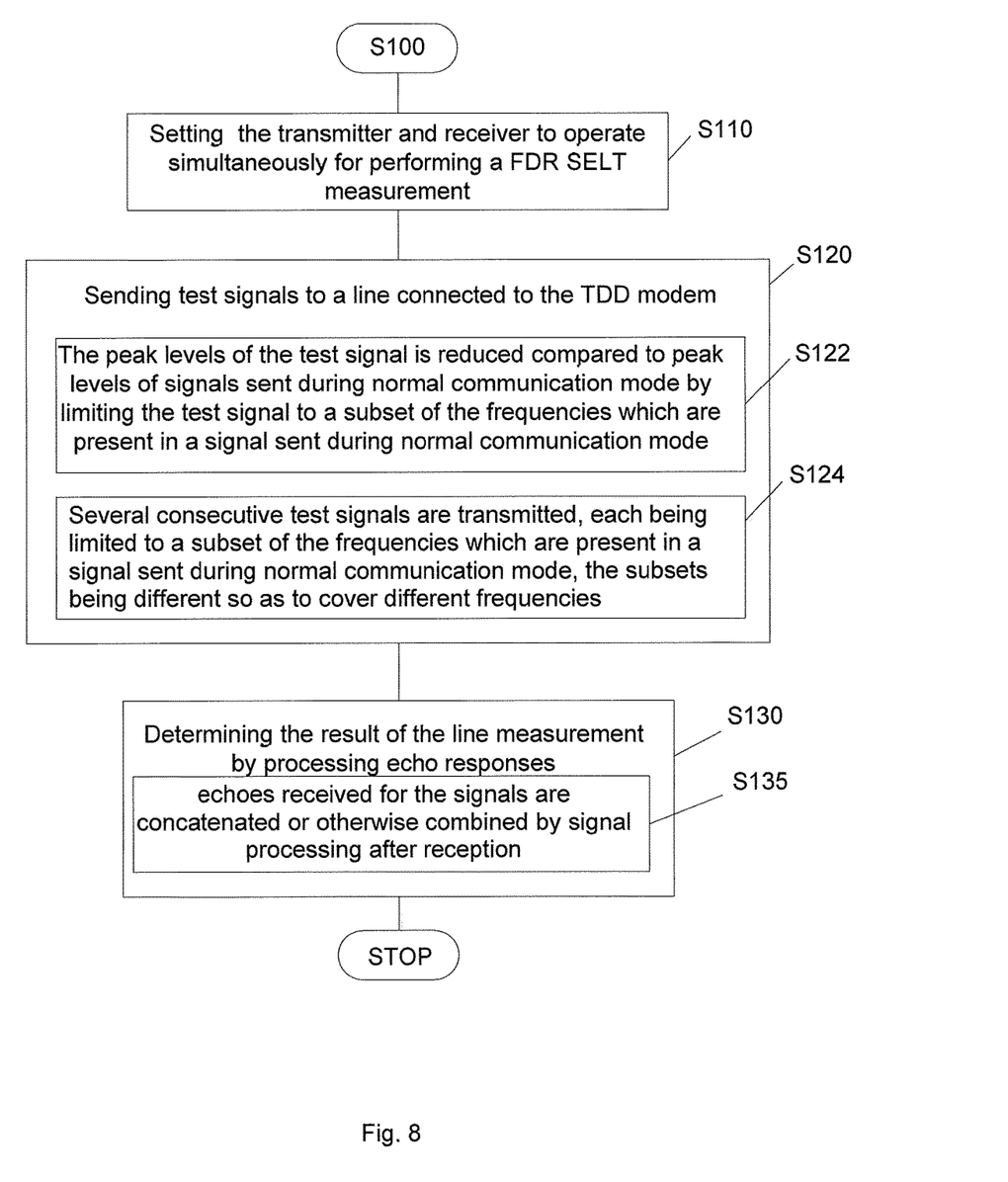
FIG. 8 is a flowchart of other embodiments for making FDR SELT measurements by means of a TDD device.

FIG. 8 is a flowchart of other embodiments for making FDR SELT measurements by means of a TDD device, such as a TDD modem or TDD frequency. The methods in a TDD modem for making line measurements comprise as described above:

S110:—Setting the transmitter and receiver to operate simultaneously for/when performing a FDR SELT measurement; said measurement comprising:

S120:—Sending test signals to a line connected to the TDD modem and receiving echo responses from the line, wherein the test signals comprises discrete tones which number and characteristic features (per data symbol) are adapted to the receiver performance and the resources of the processing means;

For improving the accuracy of the FDR SELT method above and for reducing the IFFT processing, this embodiment of the method involves using a lower highest frequency f1 in the test signal compared to the highest frequency f2 used in a signal sent during normal communication mode. The method step S120 therefore involves:

S122:—The peak levels of the test signal is reduced compared to peak levels of signals sent during normal communication mode by limiting the test signal to a subset of the frequencies which are present in a signal sent during normal communication mode; and S124:—Several consecutive test signals are transmitted, each being limited to a subset of the frequencies which are present in a signal sent during normal communication mode, the subsets being different so as to cover different frequencies; and S130:—Determining the result of the line measurement by processing received echo responses, comprising step S135:

Echoes received for the signals are concatenated or otherwise combined by signal processing after reception. Here the signals corresponds to said subsets.

Thus, to reduce the problem of having a strong signal echoing directly into the receiver, the SELT bandwidth is divided into sub-sets or blocks of tones where only one sub-set or block is transmitted per symbol or group of symbols. This means that the signal power per data symbol will be much lower than if a full band signal is transmitted. When all sub-sets or blocks have been transmitted, the received echoes from each block are combined to create the SELT-echo. In this way the combined signal will be the same as if a full-power wideband signal would have been transmitted, assuming that the characteristics of the communication line (echo path) do not change between measurements. The major gain with this solution is that Crest factor or Peak-to-Average Power Ratio (PAR) value on the direct echo-signal will be smaller with fewer tones. The probability of getting peaks in the output signal from the IFFT depends on the number tones. To keep the PAR value down relaxes the dynamic range requirement.

The relation between the N used subcarriers in a 4-QAM OFDM signal and the Crest-factor can be expressed as the peak value of the signal divided with the RMS value of the signal. Assuming that each of the N subcarriers have unit energy; the peak value is $N\sqrt{2}$ and the RMS-value is equal to $\sqrt{N}$. The Crest factor can then be expressed as $$\frac{N\sqrt{2}}{\sqrt{N}} = \sqrt{2N}.$$

Typically the Crest factor is expressed in dB which gives $20 \log(\sqrt{2N})$. As an example if the number of tones is 64 this would give a crest factor of 21 dB whereas with 512 tones it is 30 dB. Now, this assumes that all tones would have the same phase and which of course not is the case as the OFDM signal is scrambled, but it illustrates that there is dependence between the number of used tones and the crest factor level. By reducing the number of loaded tones in the SELT signal the requirement on the AD-converter can be relaxed as the Crest factor will be lower. The bandwidth over which the FDR measurement is performed consists of $N_{SELT}$ tones which are divided into M blocks of m tones (subcarriers) in each block where a block is denoted $m_i$ i=0, 1, 2, ..., M−1 and where $m_0+m_1+ \ldots +m_{M-1}=N_{SELT}$. The IFFT size $2N_{FFT}$ for the transmitted signal should then be $2N_{FFT}=2^{ceil(log_2(N^{SELT}))+1}$ where log 2 is the logarithm to the base 2. The FDR measurement then consists of making M FDR measurements where each measurement is an IFFT of size $2N_{FFT}$ consisting of m tones loaded with random 4-QAM data. If m is not equal to $N_{FFT}$ each block m is appended with zero tones The M block can be expressed as $m_0=[t_1, t_2, \ldots, t_m]$, $m_1=[t_{1+m}, t_{2+m}], \ldots, m_{M-1}=[t_{m(M-1)+1}, t_{m(M-1)+2}, \ldots, t_{Mm}]$, where $t_i$ denotes the tone index that is loaded with complex data. The SELT signal can then be expressed;

block $m_0$, $x_n = \sum_{k=t_1}^{t_m} Z_k \cdot e^{i2\pi \frac{kn}{2N_{FFT}}} + \sum_{k=N_{FFT}+t_1}^{2N_{FFT}-t_m} Z^*_{N_{FFT}-k} \cdot e^{i2\pi \frac{kn}{2N_{FFT}}}$;

block $m_1$, $x_n = \sum_{k=t_1+m}^{t_{2m}} Z_k \cdot e^{i2\pi \frac{kn}{2N_{FFT}}} + \sum_{k=N_{FFT}+t_{1+m}}^{2N_{FFT}-t_{2m}} Z^*_{N_{FFT}-k} \cdot e^{i2\pi \frac{kn}{2N_{FFT}}}$;

block $m_{M-1}$, $x_n = \sum_{k=t_{m(M-1)+1}}^{t_{Mm}} Z_k \cdot e^{i2\pi \frac{kn}{2N_{FFT}}} + \sum_{k=N_{FFT}+t_{m(M-1)+1}}^{2N_{FFT}-t_{Mm}} Z^*_{N_{FFT}-k} \cdot e^{i2\pi \frac{kn}{2N_{FFT}}}$ for n=0 to $2N_{FFT-1}$, Z represents the complex data. The second term in the summation makes a hermitian extension and results in that $x_n$ becomes real. The IFFTs are done in a sequential order and for each block an FDR measurement is made. In this way can an FDR measurement be made over all the $N_{SELT}$ tones where for each measurement just a subset of tones are used.

Figure 9:
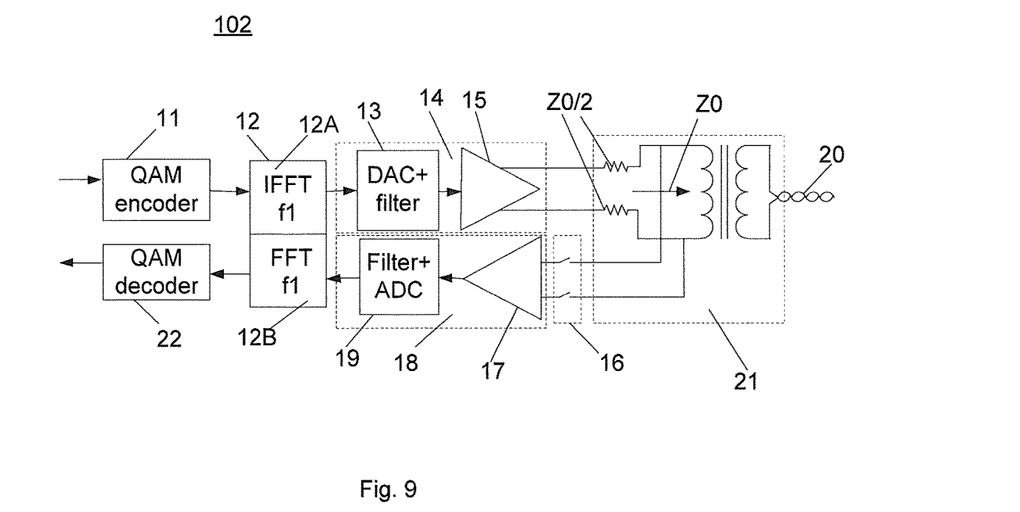
FIGS. 9 and 10 are block diagrams illustrating two embodiments of a TDD device adapted to the method illustrated in FIG. 8.
Figure 10:
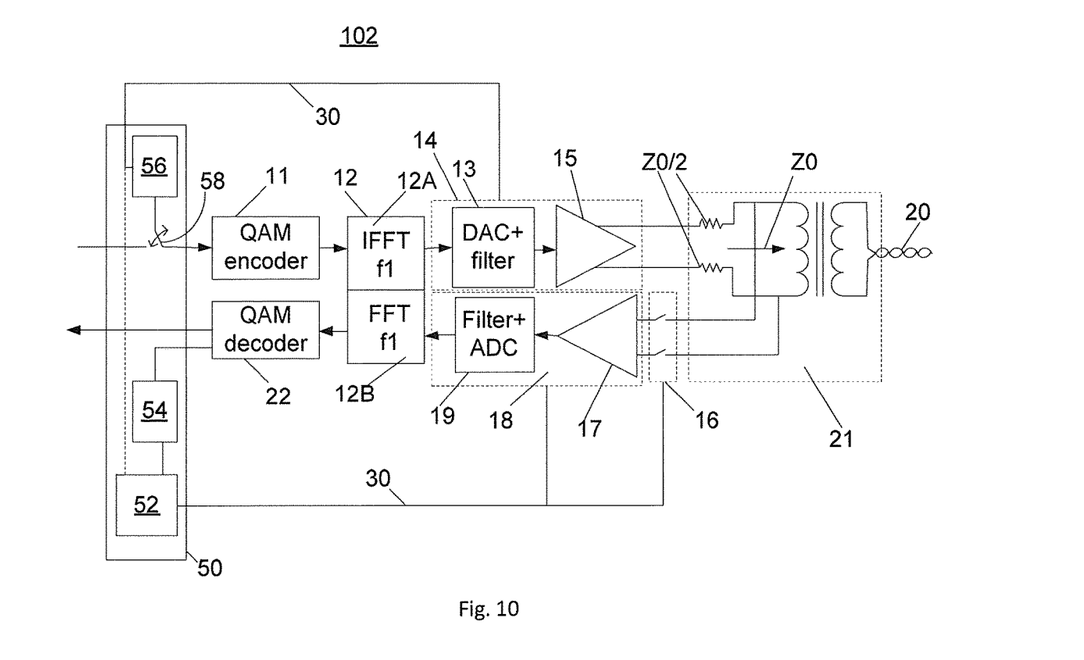

FIGS. 9 and 10 illustrates two embodiments of a TDD device 102, e.g. a modem or transceiver, for making line measurements according to the method described above, see flowchart in FIG. 8. The device comprises a transmitter 14 and a receiver 18, and it has a normal mode of TDD communication. The TDD device further comprises means for performing FDR SELT measurement 50, during which the transmitter 14 and receiver 18 operate simultaneously. The means 50 for performing FDR SELT measurement is configured to send a test signal to the line 20. The TDD modem comprises means 52 for setting the transmitter and receiver to operate simultaneously for/when performing a FDR SELT measurement. The TDD device 102 and the TDD device 100 comprise mainly similar components. Components of the TDD device 100 have already been described in connection with the text related to FIG. 5. In the following description, a description of the components of the TDD device 102 having the same reference number as the components of the TDD device 100 are not repeated.

The embodiments of TDD devices 102 will now be described in more detail with reference to FIG. 10. By using less bandwidth, i.e. fewer subcarriers in the IFFT/FFT block or resource, resources can be freed such that the IFFT/FFT block or resource can be separated into an IFFT block or resource 12a and an FFT block or resource 12b working simultaneously but at a lower bandwidth. The IFFT processing for the test signal may be reduced compared to IFFT processing for signals sent during normal communication mode by adapting the test signals to the available resource of the IFFT processing means. The TDD device is configured to operate according to the method illustrated in FIG. 7 and the flowchart in FIG. 8 and corresponding description. Sender 56 to send test signals to a line/loop connected to the TDD modem and receiver to receive echo responses from the line/loop, wherein the test signals comprise discrete tones, subcarriers, which number and characteristic features (per data symbol) are adapted to the receiver performance and the resources of the IFFT/FFT processing means 12. The SELT measurement block 50 may also comprise a measurement processor 54, which is a processing means configured to determine the result of the line measurement by processing said received echo responses.

Another way to reduce the problem with the strong signal is to simply reduce the output power of the test signal as will be described with reference to FIG. 11.

Figure 11:
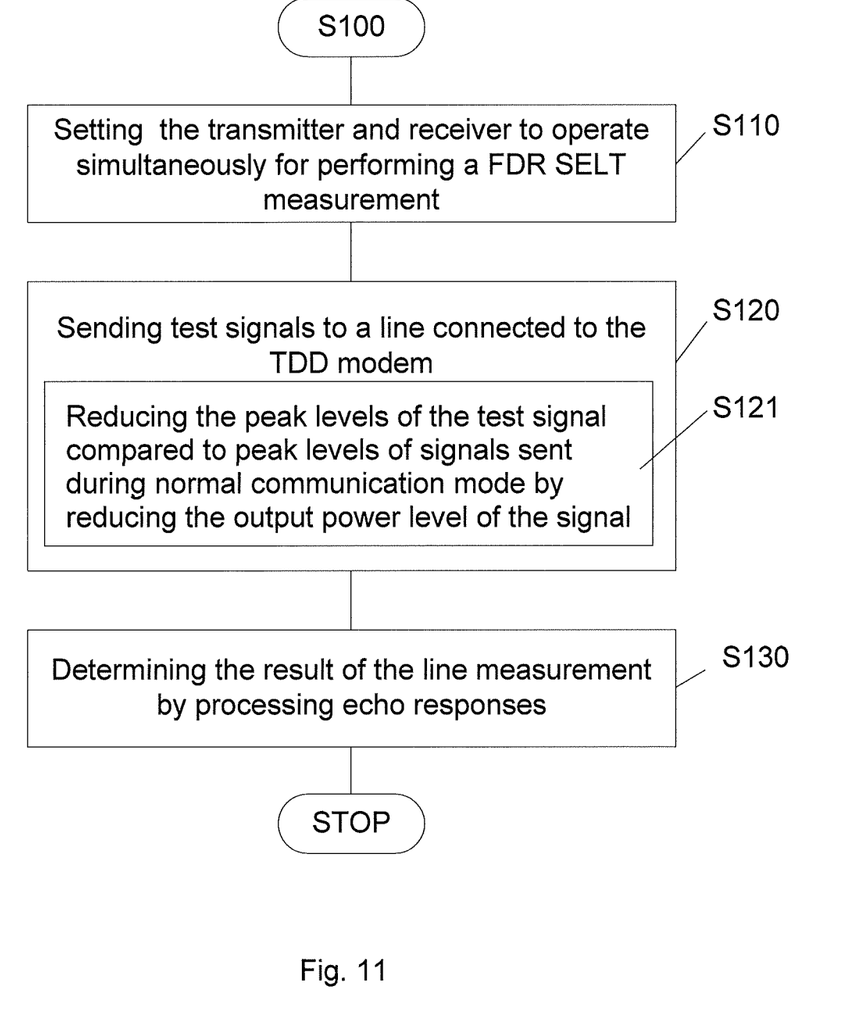
FIG. 11 is a flowchart illustrating another embodiment of a FDR SELT measurement method which improves the accuracy of a FDR SELT measurement result.

FIG. 11 is a flowchart illustrating another embodiment of FDR SELT measurement method which improves the accuracy of a FDR SELT measurement result. The method in a TDD modem for making line measurements comprises as described above:
    setting the transmitter and receiver to operate simultaneously for/when performing a FDR SELT measurement, step S110; said measurement comprising step S120:
        sending test signals to a line/loop connected to the TDD modem and receiving echo responses from the line/loop, wherein the test signals comprises discrete tones which number and characteristic features (per data symbol) are adapted to the receiver performance and the resources of the processing means;
The step S120 of sending test signals further involves a step S121 of reducing the peak levels of the test signal compared to peak levels of signals sent during normal communication mode by reducing the output power level of the signal. The controller unit 52 may therefore be configured to send commands or instructions via control buses 30 to the power amplifier 15 of the transmitter block 14 to reduce the output power of the test signal. The amplifier 15 and control unit 52 may therefore constitute limiter circuitry configured to reduce the output power level of the test signal or configured to reduce peak levels of the test signal. However, this has the disadvantage that the received echo will also be correspondingly weaker.

Figure 12:
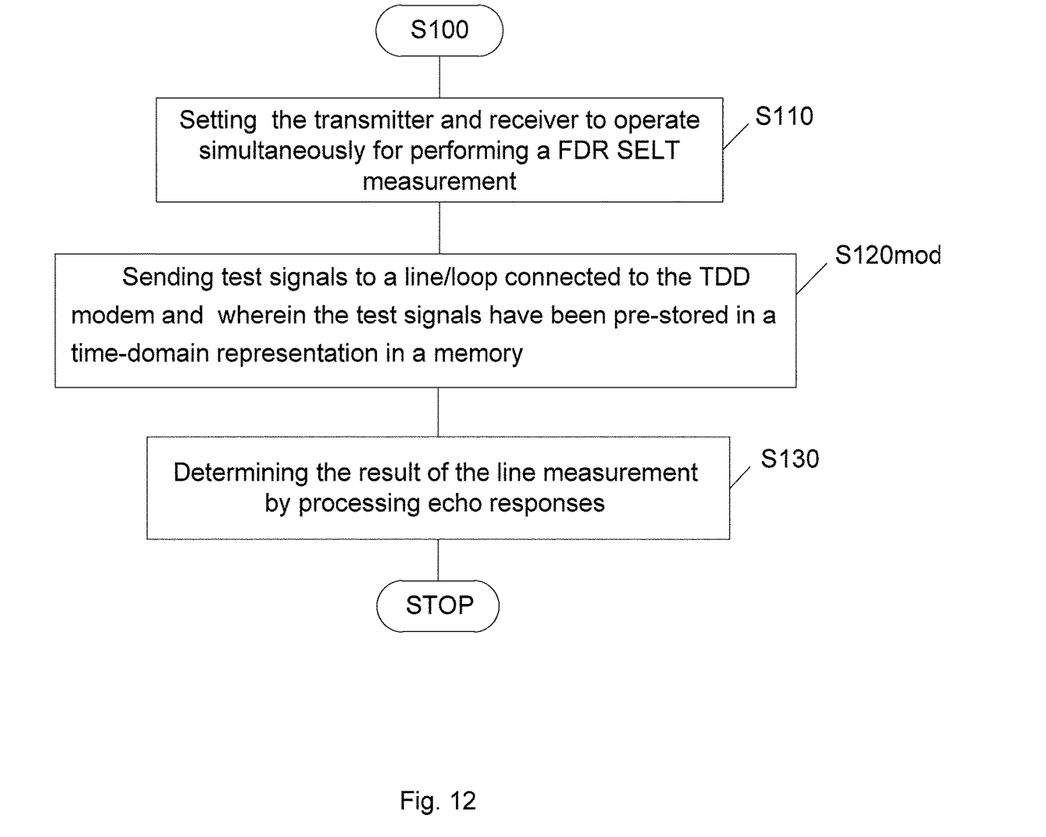
FIG. 12 is a flowchart illustrating further one embodiment of a FDR SELT method.

FIG. 12 is a flowchart illustrating further another embodiment of FDR SELT measurement method which improves the accuracy of a FDR SELT measurement result and reduces the IFFT processing compared to IFFT processing for signals sent during normal communication mode. The method comprises a modified step S120 mod of sending test signals S120:
    Sending test signals to a line connected to the TDD modem and receiving echo responses from the line, wherein the test signals comprises discrete tones which number and characteristic features (per data symbol) are adapted to the receiver performance and the resources of the processing means, and wherein the test signals have been pre-stored in a time-domain representation in a memory.

Figure 13:
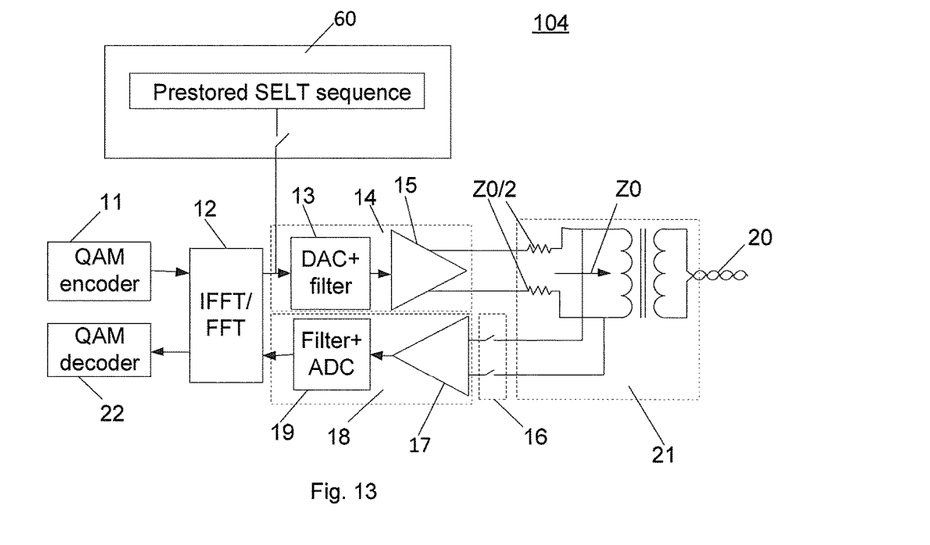
FIGS. 13 and 14 are block diagrams illustrating TDD devices designed to operate according to embodiments of the method illustrated in FIG. 12.
Figure 14:
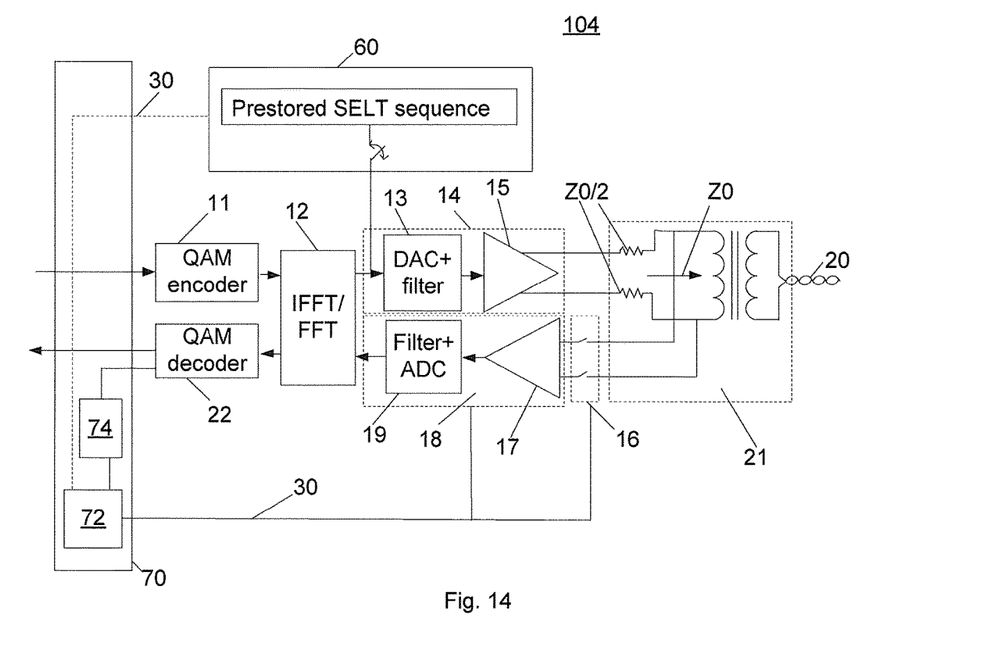

FIGS. 13 and 14 are illustrating TDD devices 104 designed according to said method, see flowchart FIG. 12, for reducing the IFFT processing during a FDR SELT measurement. The two embodiments of a TDD device, e.g. a modem or transceiver, comprise a transmitter 14 and a receiver 18, and it has a normal mode of TDD communication. According to said embodiments, the TDD device 104 is provided with a memory 60, which is used for pre-storing the SELT transmit signal in a time domain format. The TDD device 104 and the TDD device 100 comprise mainly similar components. Components of the TDD device 100 have already been described in connection with the text related to FIG. 5. In the following description, a description of the components of the TDD device 104 having the same reference number as the components of the TDD device 100 are not repeated.

The embodiments of the TDD device 104 will now be described in more detail with reference to FIG. 14. The TDD device is provided with means for performing FDR SELT measurement 70, during which the transmitter 14 and receiver 18 operate simultaneously. The means 70 for performing FDR SELT measurement differs from the SELT measurement block 50, described in the previous embodiments and FIGS. 5 and 10. The SELT measurement block 50 is configured to generate and send a test signal to the line 20. In the following embodiment, the TDD device is provided with a memory 60, which is used for pre-storing the SELT transmit signal in a time domain format $X_n$. The alternative SELT measurement block 70 does not comprise a test signal generator and sender 56, which sends test signals to a line/loop connected to the TDD modem and receiver to receive echo responses from the line/loop. This means that the IFFT is not needed to generate the FDR signals and thus, the whole IFFT/FFT block can be used as an FFT block for the receiver. The pre-stored sequences can be generated in many different ways, e.g. by the IFFT block in idle mode before the measurement or by an external management system. The prestored sequences could be defined in such a way that the PAR value is minimized, this will also reduce requirement on the dynamic range of the A/D converter 19.

However, the alternative SELT measurement block 70 may comprise a controller unit 72, a measurement processor 74, and a switch 78. The controller unit 72 may control the startup of a SELT FDR measurement, the TDD device during the measurement and the return of TDD device to normal mode of TDD communication. The controller unit 72 is therefore configured to send commands or instructions via control buses 30 to the switch 78, and the measurement processor 74 of the SELT measurement block 70, but also to components or blocks of the TDD device. Thus, the controller unit 72 may therefore be configured to send commands or instructions via control buses 30 to the switches 16, and to the components of the transmitter block 14 and the receiver block 18. Said means 72 is able to set the transmitter and receiver to operate simultaneously for/when performing a FDR SELT measurement. FDR SELT measurement is achieved by closing the switches 16 to the receiver 18, the reflected signal and part of the transmitted signal will go into the receive amplifier 17 and the AD converter 19.

The control unit 72 is configured to activate the memory 60 to send a pre-stored SELT sequence of signals to the transmitter block 14 to the line 20. The resulting echo signals are received by the TDD device. The resulting echo signals of a sent test signal in a measurement are processed by the measurement processor 74 and the result may be stored or transferred to external equipment, e.g. a display or screen for displaying the result of the measurement.

The described embodiments may be implemented in digital electronically circuitry, or in computer hardware, firmware, software, or in combinations of them. Apparatus of the may be implemented in a computer program product tangibly embodied in a machine readable storage device for execution by a programmable processor; and method steps of the invention may be performed by a programmable processor executing a program of instructions to perform functions of the invention by operating on input data and generating output.

The embodiments may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Generally, a processor such as the IFFT/FFT processor 12, controller unit 52, 72 and the measurement processor 54, 74 will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such internal hard disks and removable disks; magneto-optical disks; and CD-ROM disks. Any of the foregoing may be supplemented by, or incorporated in, specially-designed ASICs (Application Specific Integrated Circuits).

A number of embodiments of the present invention have been described. It will be understood that various modifications may be made without departing from the scope of the invention. Therefore, other implementations are within the scope of the following claims.

REFERENCE LIST

[1] Standardization document ITU-T 6.993.2 (International Telecommunication union Telecommunication Standardization Sector)

The invention claimed is:

1. A method in a Time Division Duplexing (TDD) modem for making line measurements, the device having a transmitter and a receiver, and having a normal mode of TDD communication, the line measurement comprises:
operating in the normal mode of TDD communication with the transmitter and the receiver set to operate in alternating transmit and receive time slots;
switching from the normal mode of TDD communication by setting the transmitter and the receiver to operate simultaneously for performing a Frequency Domain Reflectometry (FDR) Single Ended Line Test (SELT) measurement in a time slot;
while out of the normal mode of TDD communication, making the FDR SELT measurement, during which the transmitter and receiver operate simultaneously, the measurement comprising sending a test signal to the line,
wherein making the FDR SELT measurement while out of the normal mode comprises sending test signals to a line/loop connected to the TDD modem and receiving echo responses from the line/loop,
wherein the test signals comprise discrete tones which number and characteristic features (per data symbol) are adapted to the receiver performance and the resources of a processor; and
the method further comprises determining the result of the line measurement by processing of said received echo responses.

2. The method according to claim 1, said method comprising Inverted Fast Fourier Transform (IFFT) processing wherein IFFT processing for the test signal being reduced compared to IFFT processing for signals sent during normal communication mode.

3. The method according to claim 2, wherein IFFT processing is reduced compared to IFFT processing for signals sent during normal communication mode by pre-storing a time-domain representation of the test signal.

4. The method according to claim 2, wherein IFFT processing is reduced by using a lower highest frequency in the test signal compared to the highest frequency used in a signal sent during normal communication mode.

5. The method according to claim 1, wherein the generating of test signals involves IFFT processing for the test signal, which processing may be reduced compared to IFFT processing for signals sent during normal communication mode for adapting the test signals to the resource of the IFFT processing means.

6. The method according to claim 1, wherein the peak levels of the test signal being reduced compared to peak levels of signals sent during normal communication mode.

7. The method according to claim 6, wherein peak levels of the test signal are reduced by limiting the test signal to a subset of the frequencies which are present in a signal sent during normal communication mode.

8. The method according to claim 7, wherein several consecutive test signals are transmitted, each being limited to a subset of the frequencies which are present in a signal sent during normal communication mode, the subsets being different so as to cover different frequencies, and wherein echoes received for the signals are concatenated or otherwise combined by signal processing after reception.

9. The method according to claim 7, wherein the FFT/IFFT processing is performed in a common mode enabling Fast Fourier Transform (FFT) processing and IFFT processing to be processed simultaneously.

10. The method according to claim 6, wherein peak levels of the test signal are reduced by reducing the output power level of the signal.

11. A Time Division Duplexing (TDD) modem for making line measurements, the TDD modem having a normal mode of TDD communication, the TDD modem comprising:
a transmitter;
a receiver; and
a processor operable to:
operate in the normal mode of TDD communication with the transmitter and the receiver set to operate in alternating transmit and receive time slots;

switch from the normal mode of TDD communications by setting the transmitter and the receiver to operate simultaneously for performing a Frequency Domain Reflectometry (FDR) Single Ended Line Test (SELT) measurement in a time slot;

while out of the normal mode of TDD communications, perform FDR SELT measurement, during which the transmitter and receiver operate simultaneously, the measurement comprising sending a test signal to the line, wherein performing the FDR SELT measurement while out of the normal mode comprises sending test signals to a line/loop connected to the TDD modem and receiving echo responses from the line/loop, wherein the test signals comprise discrete tones which number and characteristic features (per data symbol) are adapted to the receiver performance and the resources of a processor, and wherein the processor is further operable to determine the result of the line measurement by Inverted Fast Fourier Transform (IFFT) processing said received echo responses.

12. The TDD modem according to claim 11, wherein the IFFT processing for the test signal being reduced compared to IFFT processing for signals sent during normal communication mode.

13. The TDD modem according to claim 12, wherein the modem comprises a storage in which a time domain representation of the test signal is pre-stored for sending on the line/loop thereby reducing IFFT processing compared to normal communication mode.

14. The TDD modem according to claim 12, wherein IFFT processing is reduced by using a lower highest frequency (f1) in the test signal compared to the highest frequency (f2) used in a signal sent during normal communication mode.

15. The TDD modem according to claim 11, wherein the generating of the test signal involves IFFT processing for the test signal, which processing may be reduced compared to IFFT processing for signals sent during normal communication mode for adapting the test signal to the resource of the processor.

16. The TDD modem according to claim 11, wherein the peak levels of the test signal being reduced compared to peak levels of signals sent during normal communication mode.

17. The TDD modem according to claim 16, wherein peak levels of the test signal are reduced by limiting the test signal to a subset of the frequencies which are present in a signal sent during normal communication mode.

18. The TDD modem according to claim 17, wherein several consecutive test signals are transmitted, each being limited to a subset of the frequencies which are present in a signal sent during normal communication mode, the subsets being different so as to cover different frequencies, and wherein echoes received for the signals are concatenated or otherwise combined by signal processing after reception.

19. The TDD modem according to claim 17, wherein the FFT/IFFT processing is performed in a common mode enabling Fast Fourier Transform (FFT) processing and IFFT processing to be processed simultaneously.

20. The TDD modem according to claim 16, wherein the modem comprises limiter circuitry configured to reduce the output power level of the test signal.

21. The TDD modem according to claim 16 wherein the modem comprises limiter circuitry configured to reduce peak levels of the test signal.

* * * * *